United States Patent

[11] 3,587,694

| [72] | Inventors | Manfred Rogalski<br>3261 Rumbeck Nr. 25, Rumbeck;<br>Friedrich Otto, 325 Hamelin, Anton-<br>Bruncker Str. 6, Hamelin, Germany |
|---|---|---|
| [21] | Appl. No. | 822,866 |
| [22] | Filed | May 5, 1969 |
| [45] | Patented | June 28, 1971 |
| [73] | Assignee | A. Stephan U. Sohne<br>Hamelin, Germany |
| [32] | Priority | May 4, 1968 |
| [33] | | Germany |
| [31] | | P 17 57 414.0 |

[54] COMMINUTING APPARATUS FOR RAW AND COOKED MEAT
9 Claims, 6 Drawing Figs.

[52] U.S. Cl. .................................................. 146/192
[51] Int. Cl. ..................................................A22c 11/00,
B02c 18/12
[50] Field of Search............................................ 146/192,
182

[56] References Cited
UNITED STATES PATENTS
2,719,011  9/1955  Bebinger........................ 146/192X
2,902,225  9/1959  Hoaglund..................... 146/192X
FOREIGN PATENTS
1,045,508  10/1966  Great Britain................ 146/192

*Primary Examiner*—Willie G. Abercrombie
*Attorney*—Michael S. Striker

ABSTRACT: Comminuting apparatus for raw and cooked meat comprising a housing having inlet means; rotary drive means journaled in said housing; and two sets of cutting means provided in said housing, one of them being affixed to said drive means, whereby both said sets of cutting means are positioned on one annulus each rotating concentrically and relatively to each other whereby said cutting means take the form of a cutting member and a cutting annulus engaging over said cutting member, whereby one cutting means each of an intermediary annulus engages between two cutting means each of the cutting annulus, in order to define between them the exact width of the cutting gap; said inlet means being arranged to admit meat into the range of cutting means of said cutting member, wherein at least one cutting edge each of the two cutting edges of the cutting annulus and of the intermediary annulus, defining between them the width of the cutting gap, is provided with teeth.

Inventors

# COMMINUTING APPARATUS FOR RAW AND COOKED MEAT

BACKGROUND OF THE INVENTION

Comminuting apparatus for raw and cooked meat comprising a housing having inlet means; rotary drive means journaled in said housing; and two sets of cutting means provided in said housing, one of them being affixed to said drive means, whereby both said sets of cutting means are positioned on one annulus each rotating concentrically and relatively to each other, whereby said cutting means take the form of a cutting member and a cutting annulus engaging over said cutting member, whereby one cutting means each of an intermediary annulus engages between two cutting means each of the cutting annulus, in order to define between them the exact width of the cutting gap; said inlet means being arranged to admit meat into the range of cutting means of said cutting member; such comminuting apparatus have been known. A corresponding embodiment of such an apparatus is, e.g., being described in German Pat. No. 1,117,439.

The degree of fineness of the material comminuted with such an apparatus is determined by the width of the cutting gaps formed by the opposed cutting means of the cutting annulus and of the intermediary annulus.

Exhaustive tests have shown that a small percentage of the material to be treated is being cut in its longitudinal direction. The dimensions of these individual particles differ from the remaining, uniformly cut ones, and although only a few such particles remain, they are nevertheless easily discernible in the otherwise very fine meat mass.

SUMMARY OF THE INVENTION

It is an object of our invention to avoid these irregularities. In accordance with the present invention this object is being achieved if at least one cutting edge of the two cutting edges of the cutting annulus and of the intermediary annulus, defining between them the width of the cutting gaps, is provided with teeth.

Another object of the invention is to provide an apparatus in which said teeth are located very near to the opposed cutting edges of said cutting annulus with which they cooperate.

A further object of the invention is to provide an apparatus in which said teeth are approximately 0.039 inches long, approximately 0.079 inches high and are superimposed at intervals of approximately 0.197 inches.

The cutting gap is thus divided into several sections, thus essentially reducing the percentage of coarse particles in the mass.

An additional object of the invention is to provide an apparatus in which said cutting means of said intermediary annulus show a substantially trapezoidal cross section.

The novel features which are considered as characteristic of the invention are set forth in particular in the appended claims. The improved comminuting apparatus itself, however, together with additional features and advantages thereof, will be best understood upon perusal of the following detailed description of certain specific embodiments with reference to the accompanying drawing.

DESCRIPTION OF THE PREFERRED EMBODIMENTS

Figure 1:
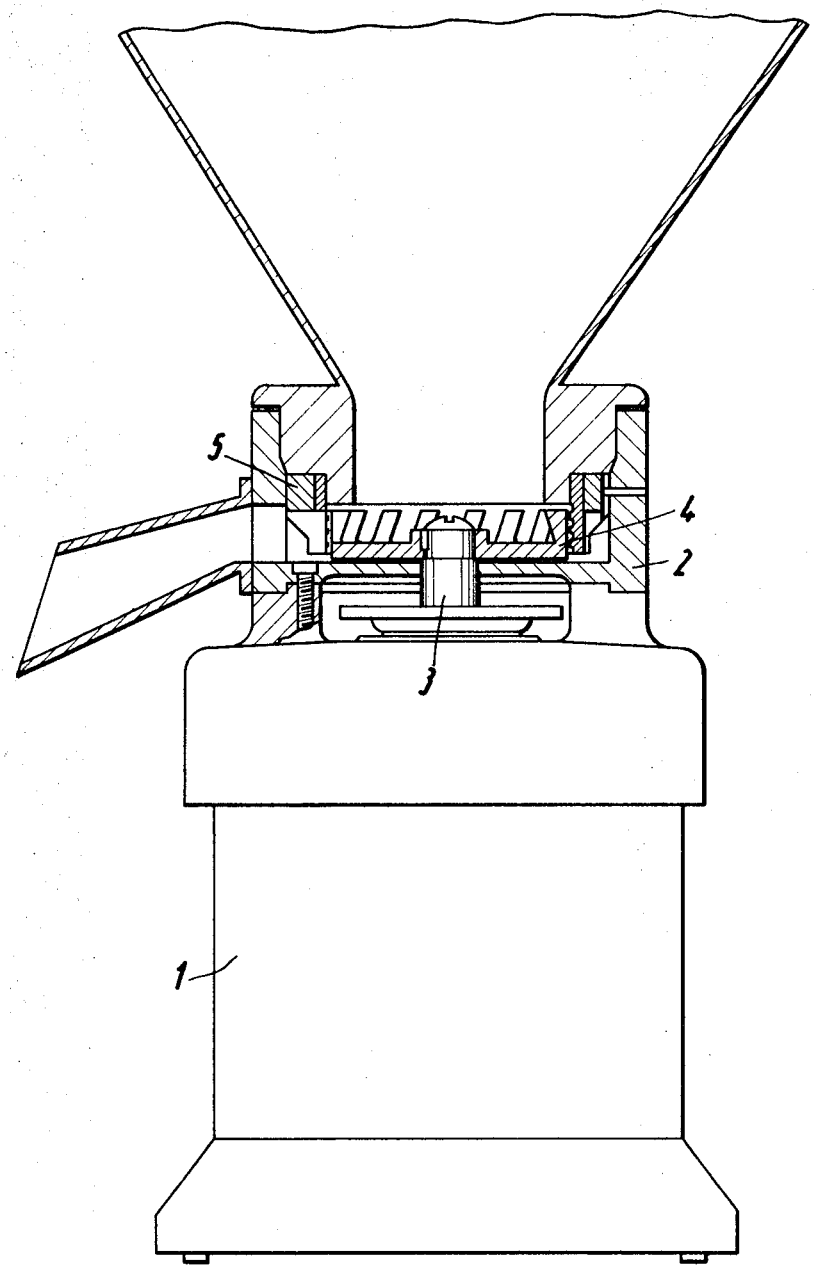
FIG. 1 is a partly sectional view of the machine comprising the comminuting apparatus which embodies our invention.
Figure 2:
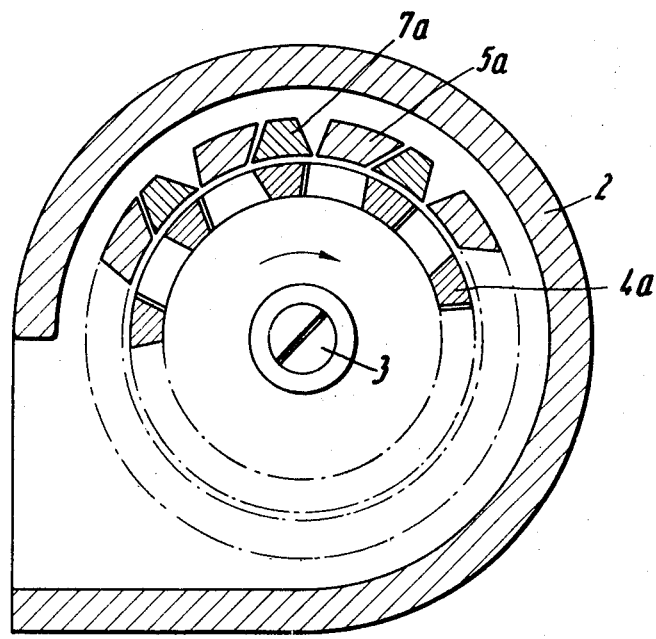
FIG. 2 is a cross-sectional view of the cutting housing.
Figure 3:
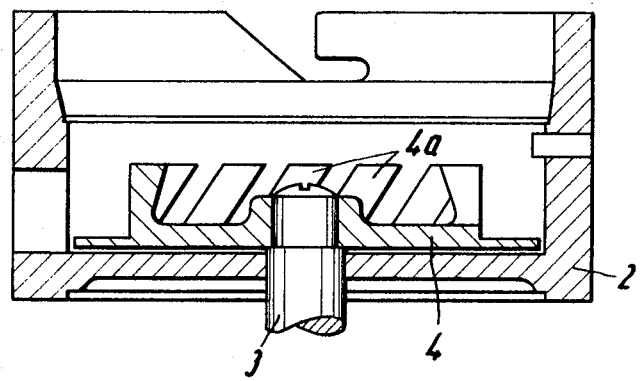
FIG. 3 is a sectional view of the cutting member.
Figure 4:
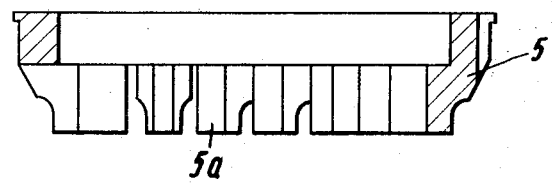
FIG. 4 is a sectional view of the cutting annulus.

FIG. 1 illustrates a comminuting apparatus which comprises a cutting housing 2 affixed on top of a motor housing 1 and a vertical drive shaft 3 penetrating through the bottom of the cutting housing 2, whereby said drive shaft drives a cutting member 4. This cutting member 4 is surrounded by a cutting annulus 5.

The cutting means 4a of the cutting member 4 are inclined and their cutting edges are opposed to those of the cutting means 5a of the cutting annulus. One cutting means 7a each of an intermediate annulus 7 which is secured to the cutting annulus 5, engages between two consecutive cutting means 5a of the cutting annulus 5 to define with these cutting means 5a the width of the cutting gaps 6 (FIG. 6).

Figure 5:
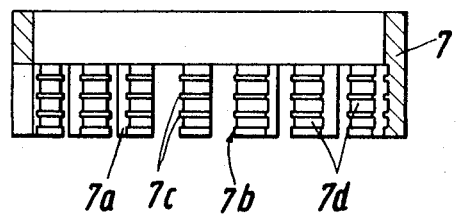
FIG. 5 is a sectional view of the new intermediary annulus.
Figure 6:
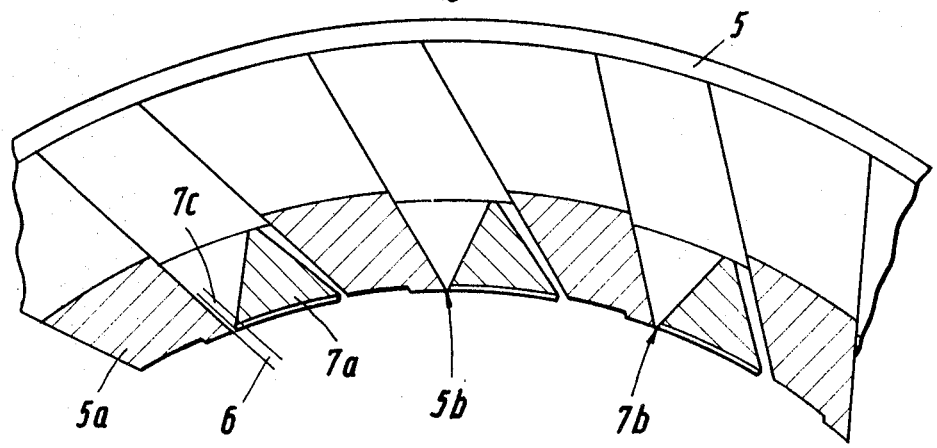
FIG. 6 is a partly top view of the cutting annulus and the intermediary annulus.

FIGS. 5 and 6 show that each of the cutting edges 7b of the cutting means 7a which latter are of trapezoidal cross section, are each directed toward the corresponding cutting edge 5b of an adjacent cutting means 5a of the cutting annulus 5 and are each provided with teeth 7c. The teeth 7c are only approximately 0.039 inch in length and are located very near to the corresponding cutting edge 5b of the cutting annulus 5. Their height is approximately 0.079 inch and they are positioned above one another at intervals of 0.197 inch.

In the embodiment shown in the drawing, the teeth 7c of the intermediate annulus 7 are formed in such a way that the material between them is removed from the internal cylindrical surface of the intermediate annulus 7 in form of grooves 7d (FIG. 5). For this reason and due to the trapezoidal cross section of the cutting means 7a, the vertical edges of the grooves 7d are set back with reference to the likewise vertical cutting edges 7b of the teeth 7c.

The drawing makes it evident that the material to be treated which is fed into the cutting member 4 is flung, due to the elevated rotational speed of the latter and after having passed the cutting means 4a, against and finally through the cutting gaps 6 formed by the cutting means 5a and 7a. During this action, the meat is not only cut along the entire height of the cutting means 4a, 5a and 7a, respectively, but is, in addition, also divided by the teeth 7c at several points in the longitudinal sense which is particularly advantageous.

This means that the material comminuted in the new apparatus is of extremely high fineness.

We claim:

1. A comminuting apparatus, particularly for raw and cooked meat, comprising in combination, a housing defining a cutting chamber and being provided with material-admitting inlet means and with outlet means both communicating with said chamber; a cutting assembly installed in said chamber in the path of material advancing to said outlet means, said cutting assembly including an inner ring-shaped cutting member having an annulus of circumferentially spaced teeth, a coaxial ring-shaped outer cutting member also having an annulus of circumferentially spaced teeth, and an insert member associated with one of said cutting members and having an annulus of circumferentially spaced supplementary teeth each of which is located between two adjacent teeth of said annulus of said one member, said adjacent teeth and said supplementary teeth being provided with respective juxtaposed cutting edges defining with one another gaps for passage of the material and at least one of said cutting edges being provided with a plurality of auxiliary cutting teeth; and drive means associated with at least one of said cutting members for rotating the same about its axis.

2. A comminuting apparatus as defined in claim 1, wherein said one cutting members associated with said drive means is said inner cutting member.

3. A comminuting apparatus as defined in claim 2, said drive means being associated with said inner cutting member, and said outer cutting member being stationary.

4. A comminuting apparatus as defined in claim 3, said auxiliary teeth having a length of substantially 0.039 inches in direction normal to said axis.

5. A comminuting apparatus as defined in claim 4, said auxiliary teeth having a height of substantially 0.079 inches in the longitudinal direction of said axis.

6. A comminuting apparatus as defined in claim 5, said auxiliary teeth being spaced from one another in said longitudinal direction by a distance of substantially 0.197 inches.

7. A comminuting apparatus as defined in claim 2, said auxiliary teeth having in the longitudinal direction of said axis a height which is substantially greater than the length of said auxiliary teeth in direction normal to said axis.

8. A comminuting apparatus as defined in claim 7, wherein said height is a multiple of said length.

9. A comminuting apparatus as defined in claim 1, wherein said supplementary teeth are of substantially trapezoidal cross section.